United States Patent
Kimbrel et al.

(10) Patent No.: US 8,230,438 B2
(45) Date of Patent: Jul. 24, 2012

(54) DYNAMIC APPLICATION PLACEMENT UNDER SERVICE AND MEMORY CONSTRAINTS

(75) Inventors: Tracy Jay Kimbrel, Cortlandt Manor, NY (US); Malgorzata Steinder, Leonia, NJ (US); Maxim Sviridenko, New York, NY (US); Asser Nasreldin Tantawi, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 12/062,569

(22) Filed: Apr. 4, 2008

(65) Prior Publication Data
US 2008/0189418 A1 Aug. 7, 2008

Related U.S. Application Data

(63) Continuation of application No. 11/110,766, filed on Apr. 21, 2005, now abandoned.

(51) Int. Cl.
*G06F 9/46* (2006.01)
*G06F 15/173* (2006.01)
(52) U.S. Cl. .................. 718/104; 718/105; 709/226
(58) Field of Classification Search .................. None
See application file for complete search history.

(56) References Cited

U.S. PATENT DOCUMENTS

| 5,774,668 | A | * | 6/1998 | Choquier et al. | ............. 709/223 |
| 6,941,341 | B2 | * | 9/2005 | Logston et al. | ............... 709/203 |
| 7,631,310 | B1 | * | 12/2009 | Henzinger | ..................... 718/105 |
| 7,720,551 | B2 | * | 5/2010 | Tantawi et al. | ..................... 700/1 |
| 7,725,900 | B2 | * | 5/2010 | Sauermann | ..................... 718/105 |
| 7,788,671 | B2 | * | 8/2010 | Black-Ziegelbein et al. | . 718/105 |
| 7,882,501 | B1 | * | 2/2011 | Carlson et al. | ................. 717/167 |
| 2003/0069974 | A1 | * | 4/2003 | Lu et al. | ......................... 709/226 |
| 2004/0181794 | A1 | * | 9/2004 | Coleman et al. | ............... 718/104 |
| 2005/0228852 | A1 | * | 10/2005 | Santos et al. | .................... 709/200 |

OTHER PUBLICATIONS

Craig W. Cameron; High-Density Model for Server Allocation and Placement; ACM 2002.*
Wolf, J. et al. Disk Load Balancing fo Video-On-Demand System, Multimedia Systems. pp. 1-6, 9-31-. 1997.
Shachnai, H. et al. On Two Class-Constrained Versions of the Multiple Knapsack Problem. Algorithmica. pp. 1-28. 2001.

* cited by examiner

*Primary Examiner* — Jennifer To
*Assistant Examiner* — Abdullah Al Kawsar
(74) *Attorney, Agent, or Firm* — Whitham, Curtis, Christofferson & Cook, P.C.; Daniel P. Morris

(57) ABSTRACT

An optimization problem models the dynamic placement of applications on servers under two types of simultaneous resource requirements, those that are dependent on the loads placed on the applications and those that are independent. The demand (load) for applications changes over time and the goal is to satisfy all the demand while changing the solution (assignment of applications to servers) as little as possible.

9 Claims, 3 Drawing Sheets

DYNAMIC APPLICATION PLACEMENT UNDER SERVICE AND MEMORY CONSTRAINTS

CROSS-REFERENCE TO RELATED APPLICATIONS

This application is a continuation application of U.S. Ser. No. 11/110,766 filed Apr. 21, 2005 now abandoned, and the complete contents thereof is herein incorporated by reference.

BACKGROUND OF THE INVENTION

1. Field of the Invention

The present invention is directed to the optimization of dynamic placement of computing applications on servers to satisfy all the applications demand while changing the assignment of applications as little as possible.

2. Background Description

With the proliferation of the World Wide Web (WWW or simply the "Web") and outsourcing of data services, computing service centers have increased in both size and complexity. Such centers provide a variety of services; for example, Web content hosting, e-commerce, Web applications, and business applications. Managing such centers is challenging since a service provider must manage the quality of service provided to competing applications in the face of unpredictable load intensity and distribution among the various offered services and applications. Several management software packages which deal with these operational management issues have been introduced. These software systems provide functions including monitoring, demand estimation, load balancing, dynamic provisioning, service differentiation, optimized resource allocation, and dynamic application placement. The last function, namely dynamic application placement, is the subject of this invention.

Service requests are satisfied through the execution of one or more instances of each of a set of applications. Applications include access to static and dynamic Web content, enterprise applications, and access to database servers. Applications may be provided by HTTP (Hypertext Transfer Protocol) Web servers, servlets, Enterprise Java Beans (EJB), or database queries. When the number of service requests for a particular application increases, the application placement management software deploys additional instances of the application in order to accommodate the increased load. It is imperative to have an on-demand management environment allowing instances of applications to be dynamically deployed and removed. The problem is to dynamically change the number of application instances so as to satisfy the dynamic load while minimizing the overhead of starting and stopping application instances.

We characterize an application by two types of parameters: (1) load-independent requirements of resources required to run an application, and (2) load-dependent requirements which are a function of the external load or demand placed on the application. Examples of load-independent requirements are memory, communication channels, and storage. Examples of load-dependent requirements are current or projected request rate, CPU (Central Processing Unit) cycles, disk activity, and number of execution threads.

We also characterize a server by two parameters: (1) a load-independent capacity which represents the amount of resources available to host applications on the server, and (2) a load-dependent capacity which represents the available capacity to process requests for the applications' services.

This invention addresses the problem of automatic instantiation of application processes in a server farm to allow the server farm to dynamically adjust the number of application processes as the load for the server processes fluctuates. Each server machine can run some number of application processes. The use of these applications processes is through request messages, to which there may be replies. The collection of servers is known as a cluster. A server machine can run only a limited number of application processes. Request messages for a particular application are split among all instances of that application. Therefore, when application instances use different servers, the size of a cluster directly impacts the amount of load that the cluster can sustain without performance degradation.

When the size of a cluster is insufficient, the application users experience performance degradation or failures, resulting in the violation of Service Level Agreements (SLA). Today, to avoid SLA violation, application providers must overprovision the number of application instances to handle peak load. This results in poor resource utilization during normal operation conditions. Dynamic allocation alleviates the problem of wasted capacity by automatically reallocating servers among applications based on their current load and SLA objectives.

Dynamic allocation techniques available today (e.g., IBM Tivoli Intelligent ThinkDynamics Orchestrator), assign applications to server clusters. Then, servers are reallocated among clusters based on the offered load.

These techniques have several limitations:

(1) When only one application can be assigned to a cluster at any given time, the granularity of resource allocation is coarse. The approach is wasteful when an application demand is not sufficient to utilize an entire server.

(2) When more than one application can be assigned to a cluster, all applications in the cluster must be running concurrently. This limits the number of applications assigned to a cluster by the memory capacity of the smallest server in the cluster. This results in wasted server capacity, as an application must execute on all servers in the cluster even if its workload could be satisfied by a subset of the servers in the cluster. Typically, only a limited number of applications can be executed on a server at a time and therefore regardless of the number of servers in the cluster, only a few applications can be served by the cluster.

(3) In the process of server reallocation from one application to another, the old application has to be uninstalled, the server reconfigured, and the new application has to be installed. Usually, network configuration also needs to change. This reconfiguration process may be time-consuming and therefore cannot be performed frequently, which results in lower responsiveness to workload changes.

The problem of optimally placing replicas of objects on servers, constrained by object and server sizes as well as capacity to satisfy a fluctuating demand for objects, has appeared in a number of fields related to distributed computing. In managing video-on-demand systems, replicas of movies are placed on storage devices and streamed by video servers to a dynamic set of clients with a highly skewed movie selection distribution. The goal is to maximize the number of admitted video stream requests. Several movie placement and video stream migration policies have been studied. A disk load balancing criterion which combines a static component and a dynamic component is described by J. L. Wolf, P. S. Yu, and H. Shachnai in "Disk load balancing for video-on-demand systems", *ACM/Springer Multimedia Systems Journal*, 5(6):358-370, 1997. The static component decides the number of copies needed for each movie by first solving an apportionment problem and then solving the problem of heuristically assigning the copies onto storage groups to limit the number of assignment changes. The dynamic component solves a discrete class-constrained resource allocation problem for optimal load balancing, and then introduces an algorithm for dynamically shifting the load among servers (i.e., migrating existing video streams).

Similar problems have been studied in theoretical optimization literature. The special case of our problem with uniform memory requirements was studied by H. Schachnai and T. Tamir in "On two class-constrained versions of the multiple knapsack problem", *Algorithmica* 29 (2001), 442-467, and H. Schachnai, T. Tamir, in "Noah Bagels: Some Combinatorial Aspects", *International Conference on FUN with Algorithms* (*FUN*), Isola d'Elba, June 1998, where some approximation algorithms were suggested. Related optimization problems include bin packing, multiple knapsack and multi-dimensional knapsack.

SUMMARY OF THE INVENTION

The present invention extends the capabilities of application server middleware with the ability to dynamically provision enterprise applications. Compared to traditional techniques, the invention allows fine granularity of resource allocation to applications. In the present invention we model the decision process for dynamic placement of applications under two or more simultaneous resource requirements: some that are dependent on the loads placed on the applications and some that are independent. The demand (load) for applications changes over time and the goal is to satisfy all the demand while changing the solution (assignment of applications to servers) as little as possible. We model the decision process as an optimization problem. We design an algorithm to solve this optimization problem.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Problem Formulation

Figure 1:
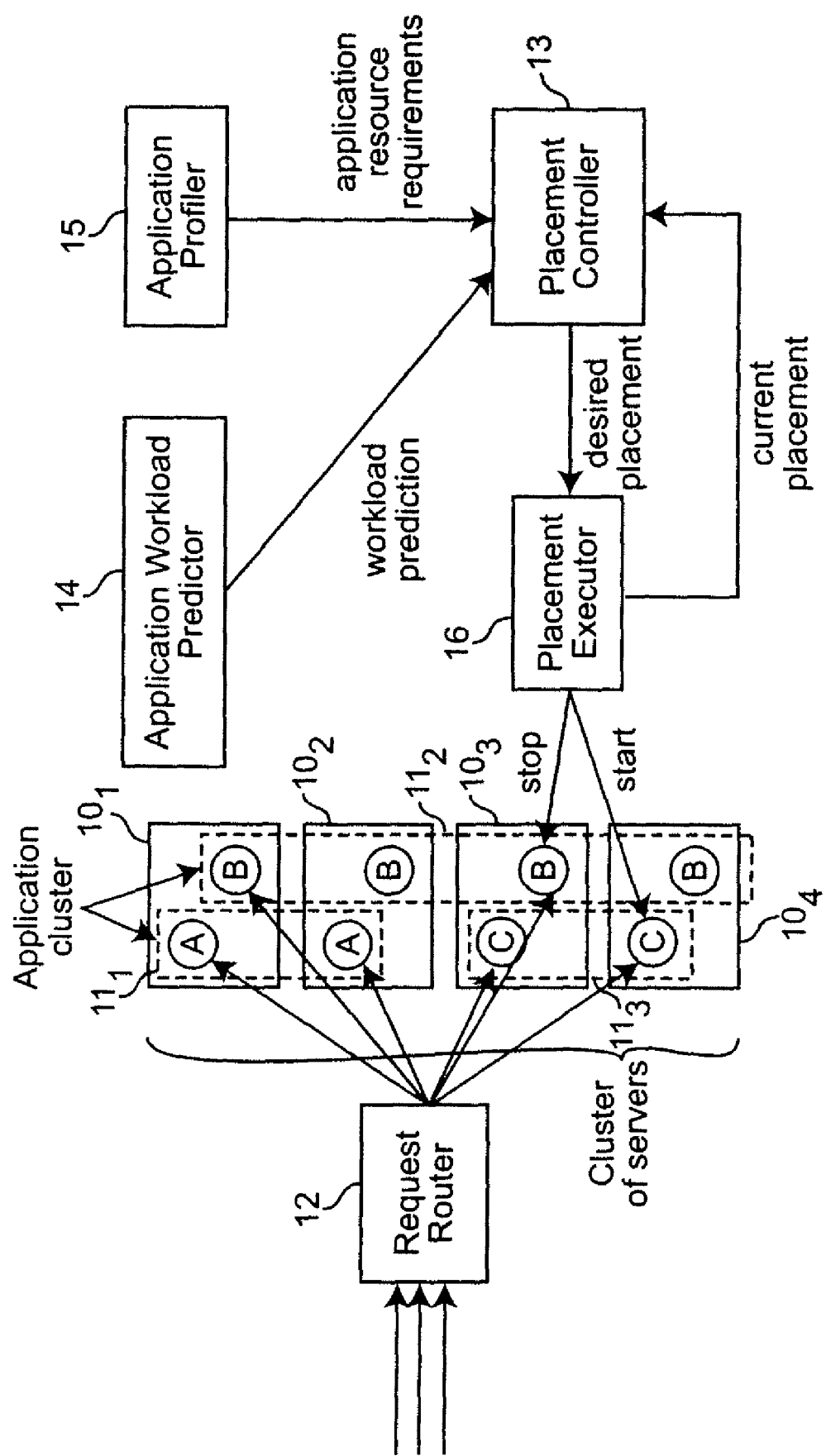
FIG. 1 is a block diagram of an exemplary system implementing the present invention.

The invention is implemented in a system as generally illustrated in FIG. 1. This system comprises a cluster of servers $10_1$, $10_2$, $10_3$ and $10_4$ across which application clusters $11_1$, $11_2$ and $11_3$ are distributed. These application clusters are designated by the letters "A", "B" and "C" running on the several servers. Thus, application cluster "A" is running on servers $10_1$ and $10_2$ and application cluster "C" is running on servers $10_3$ and $10_4$, while application cluster "B" is running on all four servers. It will of course be understood by those skilled in the art that four servers and three application clusters are used here for illustrative purposes only and that, in practice, there may be any number of servers and any number of application clusters. Requests for specific ones of the application clusters from various clients (not shown) are received by a request router 12 and directed to the appropriate application cluster, as shown in FIG. 1.

As will be described in more detail herein below, the invention provides a placement controller 13 which receives input from an application workload predictor 14 and an application profiler 15. From the application workload predictor 14, the placement controller 13 receives a workload prediction, and from the application profiler 15, the placement controller 13 receives application resource requirements. The placement controller 13 generates a desired placement which is executed by the placement executor 16. The placement executor, in turn, feeds back to the placement controller 13 information on the current placement of applications.

The dynamic application placement problem is formulated as follows: We are given m servers $1, \ldots, m$ with memory capacities $\Gamma_1, \ldots, \Gamma_m$ and service capacities (number of requests that can be served per unit time) $\Omega_1, \ldots, \Omega_m$. We are also given n applications $1, \ldots, n$ with memory requirements $\gamma_1, \ldots, \gamma_n$. Application j must serve some number of requests $\omega_{jt}$ in time interval t.

A feasible solution for the problem at time step t is an assignment of applications' workloads to servers. Each application can be assigned to (replicated on) multiple servers. For every server i that an application j is assigned to, the solution must specify the number $\omega_{itj}$ of requests this server processes for this application. $\Sigma_i \omega_{itj}$ must equal $\omega_{jt}$ for all applications j and time steps t. For every server the memory and processing constraints must be respected. The sum of memory requirements of applications assigned to a server cannot exceed its memory $\Gamma_i$ and $\Sigma_i \omega_{itj}$, i.e., the total number of requests served by this server during the time step t cannot exceed $\Omega_i$. Note that each assignment (copy) of an application to a server incurs the full memory costs, whereas the processing load is divided among the copies.

The objective is to find a solution that time step t which is not very different from the solution at time step t−1. More formally, with every feasible solution we associate a bipartite graph $(A, S, E_t)$ where A represents the set of that application j is assigned to (or has copy on) server i at time step t. Our objective function is to minimize $|E_t \emptyset E_{t-1}|$, i.e., the cardinality of the symmetric difference of the two edge sets. This is the number of application instances that must be shut down or loaded at time t.

Algorithm

We first describe an algorithm that builds a solution from scratch, i.e., under the assumption that $E_{t-1} = \emptyset$, either because this is the first step (t=1) or because the solution from the previous step t−1 is very bad for serving demands at step t. This heuristic will be also used later as a subroutine when we describe an incremental algorithm which optimizes the objective function as we move from step t−1 to t. At the risk of slight confusion, we will refer to this heuristic as the initial placement heuristic even when it is used as part of the incremental construction.

Initial Placement Algorithm Description

We order all servers by decreasing value of their densities $\Omega_i/\Gamma_i$, and order applications by decreasing densities $\omega_{jt}/\gamma_j$. Then we load the highest density application j to the highest density server i which has enough memory for that application.

If the available service capacity $\Omega_i$ of a server i is larger then service requirement $\omega_{jt}$ of an application that we assign to the server, then we delete application j from the list of unscheduled applications. We re-compute the available memory and service capacities of the server i by subtracting the amounts of resources consumed by application j and insert server i back into the list of servers according to its new density $\Omega_i/\Gamma_i$ with the updated values $\Omega_i$ and $\Gamma_i$.

If the available service capacity $\Omega_i$ of the server i is exceeded by the demand $\omega_{jt}$, we still assign application j to server i, but this application's demand served by this server is limited by the server's (remaining) service capacity. We remove the server from the list.

In the latter case that the service capacity on the server i is exceeded by application j assigned to it, let $\omega'_{jt}$ be the amount of demand of application j assigned to this server and let $\omega''_{jt}$ be the remaining demand; note $\omega'_{jt}+\omega''_{jt}=\omega_{jt}$. Since the server i cannot serve all demand of applications, we will need to load at least one more copy of it on another server, but we do not yet know which server. The density of the remaining demand is $\omega''_{jt}/\gamma_j$. We place the application back in the list with this value as its density in the sequence of remaining applications (in the appropriate place in the list ordered by densities). Then we move on to the next highest density application, and so on.

The intuition behind the rule is as follows. We should match applications which have many requests per unit of memory with servers which have high processing capacity per unit of memory. It is not wise to assign applications with high density to a low density server, since we would be likely to reach the processing capacity constraint and leave a lot of memory unused on that server. Similarly, if low density applications are loaded on high density servers, we would be likely to reach the server's memory constraint without using much of the processing capacity.

Note that for every server the algorithm splits the demand of at most one application between this server and some other servers. Thus, the total number of application-to-server mappings (edges in the bipartite graph) is at most n+m−1.

Initial Placement Flow Diagram Description

Figure 2:
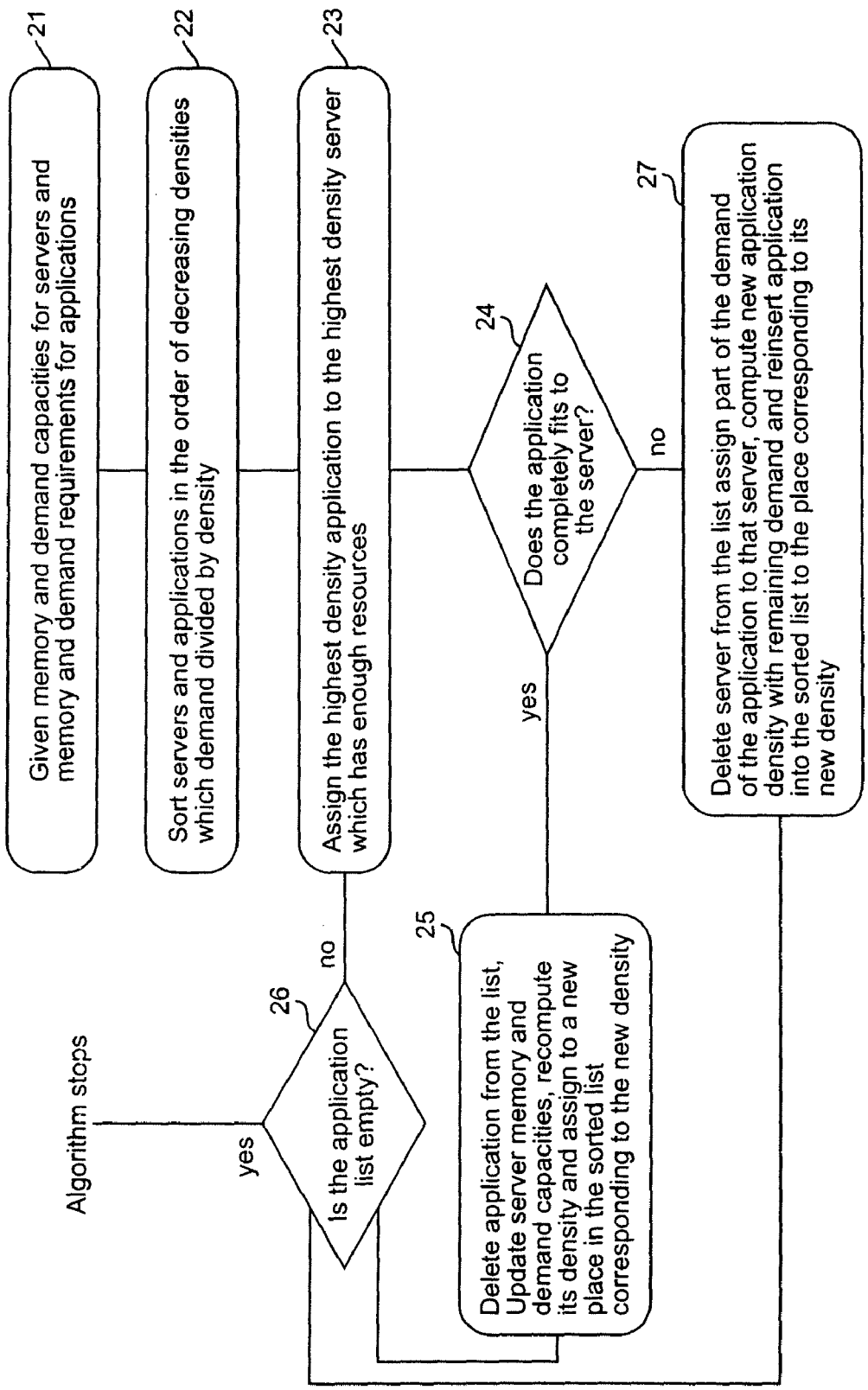
FIG. 2 is a flow diagram illustrating the logic of the Initial Placement Algorithm according to the invention.

The initial placement algorithm is illustrated in the flow diagram of FIG. 2. The initial conditions in function block 21 are the memory and demand capacities for the servers and the memory and demand requirements for the applications. In function block 22, we order all servers by decreasing value of their densities $\Omega_i/\Gamma_i$, and order applications by decreasing densities $\omega_{jt}/\gamma_j$. Then, in function block 23, we load the highest density application j to the highest density server i which has enough memory for that application.

We check if the application completely fits to the server. If yes, we delete application j from the list of unscheduled applications in function block 25. We re-compute in function block 25 the available memory and service capacities of the server i by subtracting the amounts of resources consumed by applications and insert server i back into the list of servers according to its new density $\Omega_i/\Gamma_i$ with the updated values $\Omega_i$ and $\Gamma_i$. After that we proceed to the decision block 26.

If the answer in decision block 24 is "no", then in the function block 27 we delete server from the list, assign part of the demand of the application to that server, compute new application density with remaining demand and reinsert application to the sorted list to the place corresponding to its new density and proceed to the decision block 26.

A test is made in decision block 26 to determine if the application list is empty and, if not, the process returns to function block 23.

Incremental Placement Algorithm Description

Although the initial placement algorithm is rather conservative in memory allocation, it could be very bad from the viewpoint of the dynamic objective function, which seeks a minimal incremental cost of unloading and loading applications between time steps. We now explain how we can combine the initial placement algorithm with a maximum flow computation to yield a heuristic for minimizing our objective function. The definition of the maximum flow problem and standard algorithms to solve it could be found in the book by R. Ahuja, T. Magnanti and J. Orlin, *Network Flows. Theory, Algorithms and Applications*, Prentice Hall, Englewood Cliffs, N.J., 1993.

Given a feasible solution on the previous step (A, S, $E_{t-1}$), we first would like to check whether we can satisfy the new demands $\omega_{jt}$ by simply using the old assignment of applications to servers. We check this by solving a bipartite flow problem. In other words, we use the edge set $E_{t-1}$. Each node corresponding to application j is a source of $\omega_{jt}$ units of flow. We test whether there is a flow satisfying these sources by routing flow to sinks corresponding to the servers, such that the flow into each sink corresponding to a server i is limited by the server's service capacity $\Omega_i$.

If this flow is feasible we are done; the flow values on the edges give the assignments of applications' loads to servers. Otherwise, there is a residual demand for every application (possibly 0 for some) which remains unassigned to servers. Denote the residual demands by $\omega'_{jt}$. For every server there are a residual memory $\Gamma_i'$ and a service capacity $\Omega_i'$ that are not consumed by the assignment given by the flow. Notice that these demands and capacities induce a problem of the same form as the initial placement problem. We apply our greedy initial placement heuristic to this instance. If our heuristic finds a feasible solution to the residual instance, we can construct an overall solution as follows. The residual instance results in a new set of edges, i.e., application-to-server mappings (applications which must be loaded onto servers), which we simply add to the existing edges. The total cost of the new solution is the number of new edges used by the heuristic to route the residual demand. This should not be large since our heuristic is conservative in defining new edges.

If our heuristic fails to find a feasible solution, we delete an edge in the graph (A, S, $E_{t-1}$) and repeat the procedure. We continue in this fashion until a feasible solution is found. The total cost is the number of deleted edges in addition to the number of new edges. In the worst case, we eventually delete all edges in the graph and build the solution from scratch using our initial placement heuristic, which is possible by our assumption that the instance is "not too hard".

It remains to define which edge should be deleted. A good heuristic choice should be the edge which minimizes the ratio of the total demand routed through this edge (i.e., the flow on this edge) divided by the memory requirement of the corresponding application. The intuition for this is that we would like to delete an edge which uses memory in the most inefficient way.

Incremental Placement Flow Diagram Description

Figure 3:
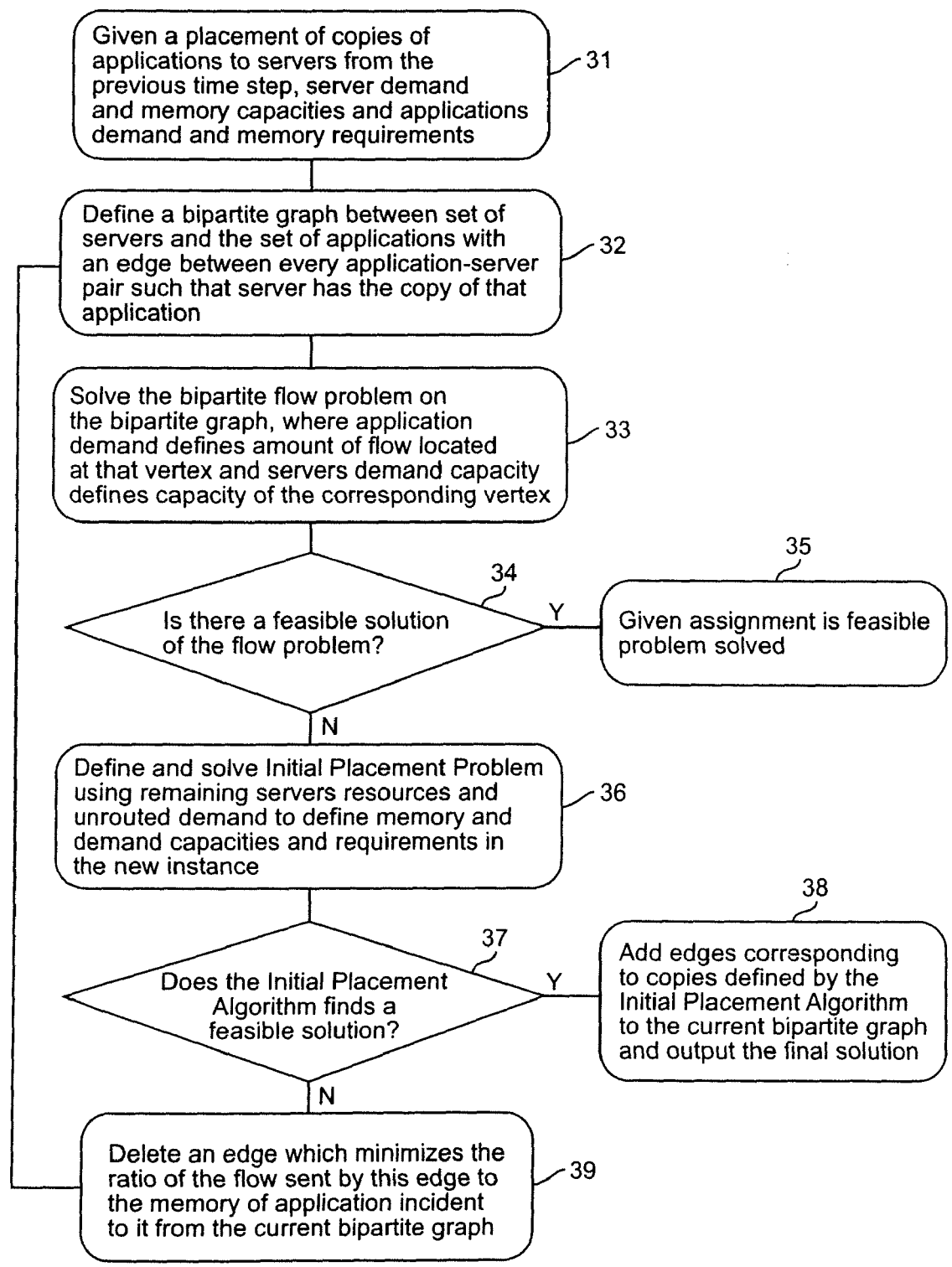
FIG. 3 is a flow diagram illustrating the logic of the Dynamic Placement Algorithm according to the invention.

The incremental placement algorithm is illustrated in the flow diagram of FIG. 3. The initial conditions in function block 31 are the placement of copies of applications to servers from the previous step, server demand and memory capacities and applications demand and memory requirements.

In function block 32, we define a bipartite graph between set of servers and the set of applications with an edge between every application-server pair such that server has a copy of that application.

Then, in function block 33, we solve the bipartite flow problem on the bipartite graph, where application demand defines amount of flow located at that vertex and servers demand capacity defines capacity of corresponding vertex.

In the decision block 34 we check if there is a feasible solution to the bipartite flow problem. If there is one we proceed to the function block 35 tells that the problem is solved. If not, we proceed to the function block 36.

In the function block 36 we define an Initial Placement Problem using remaining servers resources and unrouted demand to define memory and demand capacities and requirements in the new instance. Then in decision block 37 we check if the solution found is feasible, if yes, then in function block 38, we define and out the final solution.

If not, then in function block 39, we delete an edge which minimizes the ratio of the flow sent by this edge to the memory of application incident to it from the current bipartite graph and proceed to function block 32.

System Implementation

Our algorithm has been incorporated into the IBM Websphere environment. A Websphere component known as the placement controller receives dynamic information about the load-independent and load-dependent requirements of the various applications, and the load-independent and load-dependent capacities of the various servers. We used memory size and CPU cycles/sec as the representative load-independent and load-dependent parameters, respectively. The placement controller is aware of the configuration, i.e., the mapping of applications onto servers in a given Websphere cell. Upon need, or periodically, the placement controller executes our algorithm in order to determine the change in application placement configuration in response to changes in loads and characteristics of the applications and servers. Then the placement controller realizes the change, automatically or in a supervised mode, through the execution of scripts to start and stop applications servers.

The system includes an application workload predictor and an application profiler. The application workload predictor utilizes historical information regarding the offered load to produce a workload prediction for each application supported by the server farm. For instance, the workload prediction can be characterized by the arrival rate of requests to a given application. Similar to the application workload predictor, the application profiler produces a set of application resource requirements by estimating the amount of server resources required by a single request of each application. The application resource requirements includes, for example, the number of CPU cycles required to process a request.

The placement controller utilizes the workload prediction and the application resource requirements provided by the application workload predictor and the application profiler to compute predicted load-dependent resource requirements for each application. Considering the predicted resource requirements for each application, the given capacities of each of the server computing nodes in the server farm, and the current application placement, the placement controller uses the algorithm presented here to compute a new placement of applications.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for on-demand application resource allocation under one or more load-dependent resource constraints and one or more load-independent resource constraints comprising the steps of:
   ordering servers by decreasing value of their densities defined as available service capacity divided by memory capacity for each server;
   ordering applications by decreasing densities defined as number of requests in a given time interval divided by memory requirements for each application;
   initially loading a highest density application to a highest density server which has enough memory for that application and loading other applications on servers according said steps of ordering; and
   dynamically reconfiguring placement of applications on servers according to an objective function which satisfy all applications demand while respecting memory and processing constraints of every server and wherein the objective function comprises a total number of applications assignment changes from a previous time interval to a current time interval,
   wherein the step of initially loading comprises the steps of:
      for each application assigned to a server, determining if the application completely fits the server;
      if the application completely fits the server, deleting the application from a sorted list of the ordered applications, updating service and memory capacities of the server and recomputing new density of the server based on the updated service and memory capacities and insert the server into the list of servers according to the new density of the server; otherwise,
      if the application does not completely fit the server, deleting the server from a sorted list of the ordered servers, assigning part of a demand for the application to the deleted server, computing a new application density with remaining demand, and re-inserting the application into the list of ordered applications according to the new density of the application; and
   returning to the ordering steps until the sorted list of ordered applications is empty.

2. The method for on-demand application resource allocation recited in claim 1, wherein in the step of dynamically reconfiguring placement of applications on servers comprises the steps of:
   defining a bipartite graph between a set of servers and a set of applications with an edge between every application-server pair such that a server of the pair has a copy of the application of the pair; and
   solving a bipartite flow problem on the bipartite graph where application demand defines an amount of flow located at that vertex and server demand capacity defines capacity of a corresponding vertex.

3. The method for on-demand application resource allocation recited in claim 2, wherein the step of dynamically reconfiguring placement of applications further comprises the steps of:
   determining if a feasible solution is found in the step of solving and, if not, defining and solving an initial placement problem using remaining server resources and unrouted demand to define memory and demand capacities and requirements;
   determining if there is a feasible solution to the initial placement problem and, if not, deleting an edge which minimizes a ratio of flow; and
   returning to the step of defining a bipartite graph until a feasible solution is found to the flow problem.

4. A system for on-demand application resource allocation under one or more load-dependent resource constraints and one or more load-independent resource constraints comprising:
   a plurality of servers arranged in one or more clusters;
   a plurality of application clusters, each said application cluster running on one or more servers in a cluster of servers;

a request router receiving application requests from a plurality of clients and directing the requests to appropriate application clusters;

a placement controller which receives an application workload prediction and application resource requirements and calculates application densities, defined as number of requests in a given time interval divided by memory requirements, and server densities, defined as available service capacity divided by memory capacity; and a placement executor responsive to said placement controller which executes application placements on said servers, wherein said placement controller initially causes said placement executor to load a highest density application to a highest density server which has enough memory for that application and loads other applications on servers according an order starting with a next highest density application; and thereafter dynamically reconfigures placement of applications on servers according to an objective function which satisfy all applications demand while respecting memory and processing constraints of every server and wherein the objective function comprises a total number of applications assignment changes from a previous time interval to a current time interval, wherein the placement controller receives feedback from the placement executor and for each application assigned to a server, determines if the application completely fits the server, and if the application completely fits the server, deletes the application from a sorted list of the ordered applications, updates service and memory capacities of the server and recomputes new density of the server based on the updated service and memory capacities and insert the server into the list of servers according to the new density of the server, but otherwise, if the application does not completely fit the server, deletes the server from a sorted list of the ordered servers, assigns part of a demand for the application to the deleted server, computes a new application density with remaining demand, and re-inserts the application into the sorted list of ordered applications according to the new density of the application, and the placement controller continues placement of the applications on the servers based on the received feedback until the sorted list of ordered applications is empty.

5. The system for on-demand application resource allocation recited in claim 4, wherein the placement controller defines a bipartite graph between a set of servers and a set of applications with an edge between every application-server pair, and solves a bipartite flow problem on the bipartite graph where application demand defines an amount of flow located at that vertex and server demand capacity defines capacity of a corresponding vertex.

6. The system for on-demand application resource allocation recited in claim 5, wherein the placement controller determines if a feasible solution is found and, if not, defines and solves an initial placement problem using remaining server resources and unrouted demand to define memory and demand capacities and requirements, determines if there is a feasible solution to the initial placement problem and, if not, deletes an edge which minimizes a ratio of flow, until a feasible solution is found to the flow problem.

7. A non-transitory, computer readable medium containing code, when executed by one or more processors, for performing on-demand application resource allocation under one or more load-dependent resource constraints and one or more load-independent resource constraints, the code implementing a method comprising the steps of:

ordering servers by decreasing value of their densities defined as available service capacity divided by memory capacity for each server;

ordering applications by decreasing densities defined as number of requests in a given time interval divided by memory requirements for each application;

initially loading a highest density application to a highest density server which has enough memory for that application and loading other applications on servers according said steps of ordering; and dynamically reconfiguring placement of applications on servers according to an objective function which satisfy all applications demand while respecting memory and processing constraints of every server and wherein the objective function comprises a total number of applications assignment changes from a previous time interval to a current time interval, wherein the code implements the step of initially loading implements the steps of:

for each application assigned to a server, determining if the application completely fits the server;

if the application completely fits the server, deleting the application from a sorted list of the ordered applications, updating service and memory capacities of the server and recomputing new density of the server based on the updated service and memory capacities and insert the server into the list of servers according to the new density of the server; otherwise, if the application does not completely fit the server, deleting the server from a sorted list of the ordered servers, assigning part of a demand for the application to the deleted server, computing a new application density with remaining demand, and re-inserting the application into the list of ordered applications according to the new density of the application; and returning to the ordering steps until the sorted list of ordered applications is empty.

8. The non-transitory, computer readable medium recited in claim 7, wherein which implements the step of dynamically reconfiguring placement of applications on servers implements the steps of:

defining a bipartite graph between a set of servers and a set of applications with an edge between every application-server pair such that a server of the pair has a copy of the application of the pair; and solving a bipartite flow problem on the bipartite graph where application demand defines an amount of flow located at that vertex and server demand capacity defines capacity of a corresponding vertex.

9. The non-transitory, computer readable medium recited in claim 8, wherein the code which implements the step of dynamically reconfiguring placement of applications further implements the steps of:

determining if a feasible solution is found in the step of solving and, if not, defining and solving an initial placement problem using remaining server resources and unrouted demand to define memory and demand capacities and requirements;

determining if there is a feasible solution to the initial placement problem and, if not, deleting an edge which minimizes a ratio of flow; and returning to the step of defining a bipartite graph until a feasible solution is found to the flow problem.

* * * * *